(12) United States Patent
Satish et al.

(10) Patent No.: US 7,832,005 B1
(45) Date of Patent: Nov. 9, 2010

(54) BEHAVIORAL LEARNING BASED SECURITY

(75) Inventors: Sourabh Satish, Mountain View, CA (US); Harlan Seymour, San Mateo, CA (US); Philip Lao, San Carlos, CA (US); John Bonamico, Morgan Hill, CA (US)

(73) Assignee: Symantec Corporation, Mountain View, CA (US)

( * ) Notice: Subject to any disclaimer, the term of this patent is extended or adjusted under 35 U.S.C. 154(b) by 1018 days.

(21) Appl. No.: 11/000,510

(22) Filed: Nov. 29, 2004

(51) Int. Cl.
*G06F 11/00* (2006.01)
(52) U.S. Cl. ....................................... 726/22
(58) Field of Classification Search .................. 726/22
See application file for complete search history.

(56) References Cited

U.S. PATENT DOCUMENTS

| | | | |
|---|---|---|---|
| 6,862,686 B1* | 3/2005 | Bahrs et al. | 726/3 |
| 7,103,913 B2* | 9/2006 | Arnold et al. | 726/22 |
| 2002/0138755 A1* | 9/2002 | Ko | 713/201 |
| 2003/0200462 A1* | 10/2003 | Munson | 713/200 |
| 2003/0212906 A1* | 11/2003 | Arnold et al. | 713/201 |
| 2004/0117624 A1* | 6/2004 | Brandt et al. | 713/166 |
| 2004/0143749 A1* | 7/2004 | Tajalli et al. | 713/200 |
| 2005/0086500 A1* | 4/2005 | Albornoz | 713/188 |

OTHER PUBLICATIONS

Hofmeyr et al, Intrusion detection using sequences of system calls, Aug. 18, 1998, Dept. of computer science, University of New Mexico, p. 1-25.*

* cited by examiner

*Primary Examiner*—Kambiz Zand
*Assistant Examiner*—Teshome Hailu
(74) *Attorney, Agent, or Firm*—Hunton & Williams, LLP

(57) ABSTRACT

Detecting deviations from normal behavior in a processing system is disclosed. Independently for each of a plurality of processes associated with the processing system, a learning phase is started for the process based on a start criteria associated with the process, the normal behavior associated with the process is learned during the learning phase, the learning phase for the process is stopped based on a stop criteria associated with the process, and a protect phase is started for the process.

23 Claims, 11 Drawing Sheets

BEHAVIORAL LEARNING BASED SECURITY

FIELD OF THE INVENTION

The present invention relates generally to computer security. More specifically, applying behavioral learning techniques with a flexible learning period to provide computer security is disclosed.

BACKGROUND OF THE INVENTION

Behavioral learning techniques have been used to provide security for computers and other processing systems. In a typical behavioral learning security system or process, the "baseline" or "normal" behavior of the system to be protected (e.g., the computer) is learned during a learning phase of fixed duration. In a subsequent protection phase, the actual behavior of the system being protected is monitored and compared against the baseline and responsive action is taken if a meaningful deviation from the expected/normal behavior is detected.

FIG. 1 is a time diagram illustrating learning phase and protection phase of a typical prior art behavioral learning security system or process. The normal or baseline behavior of the system to be protected is learned during learning phase 100 which starts at start time 104, lasts for a fixed duration 106, and stops at stop time 108. After this learning phase, the system is in protect phase 102 in which behavior that deviates from the behavior learned during the learning period is identified and appropriate action is taken.

Under the prior art, processes or sub-processes that do not occur during the learning period are missed, and subsequent occurrences of such processes during the protected phase may generate responsive action by the security system or process, because they deviate from the learned baseline, even though they are normal and/or expected. Extending the duration of the learning period to allow for more complete learning of the normal processes may not be practical or desirable, since the system being learned remains unprotected during the learning phase. In addition, such a security system or process is unfriendly to changes to the system being protected (e.g. software upgrades, system upgrades, or new software additions), because in the event of such a change the entire learning process has to be repeated to enable the security system or process to learn the new normal processes present on the system being protected as a result of the change.

Therefore, there is a need for a better way to use behavioral learning to provide security for a computer or other system, which enables the processes of the computer or other system to be learned more completely without leaving the system unprotected for a protracted learning period.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing security by learning normal behavior on a per process basis is disclosed. In one embodiment, a learning phase is started and stopped independently for each of a plurality of processes to be learned. When the learning phase for a process stops, a protect phase begins for that process during which the actual behavior associated with the process is checked for deviations from the "baseline" or "normal" behavior learned during the learning phase for that process. The terms "baseline" and "normal" as used herein refer to the behavior(s) associated with a process as learned during a learning phase for that process. The learned baseline is "normal" in the sense that it is the behavior to which observed behavior will be compared to protect the system with which the process is associated by detecting deviations from the learned baseline.

Figure 1:
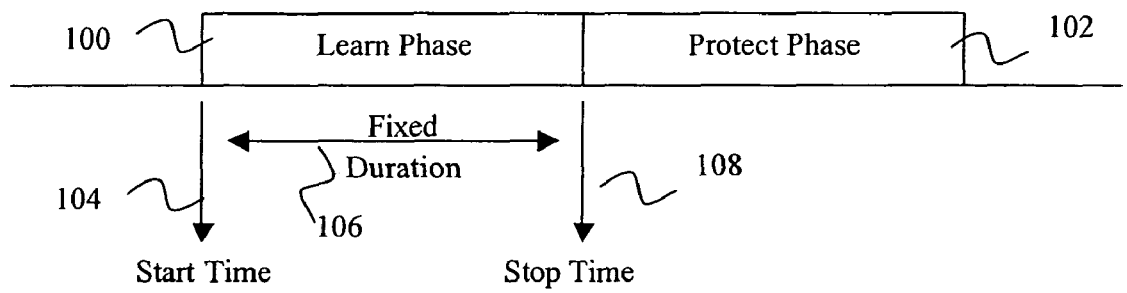
FIG. 1 illustrates the learning phase and protection phase of a prior art behavioral security system.
Figure 2:
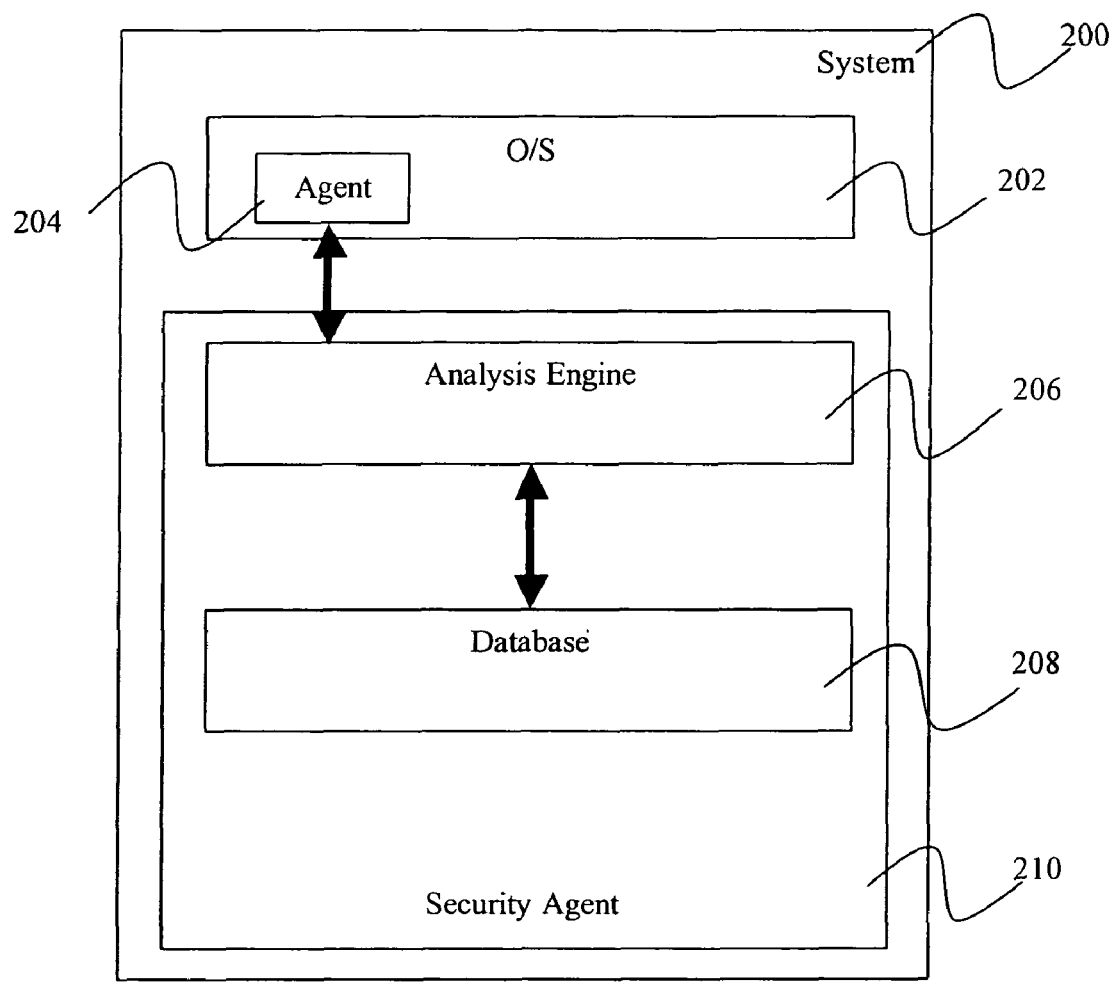
FIG. 2 illustrates a behavioral learning security system.

FIG. 2 is a block diagram illustrating a behavioral learning security system used in one embodiment. System 200 runs operating system (O/S) 202. Agent 204 provides information to security agent 210. In one embodiment, agent 204 monitors system calls and reports each system call and the process that generated the call to the security agent 210. In some embodiments, all or part of the security agent is not on system 200. Security agent 210 contains analysis engine 206 and database 208. Analysis engine 206 processes data received from agent 204 to learn processes on a per process basis and provide protection for any processes for which learning has been completed and protection has begun. During the learning phase for a process, data associated with the process may be stored in database 208, e.g., for use as and/or in preparing a model of the baseline or normal behavior associated with the process being learned.

Figure 3:
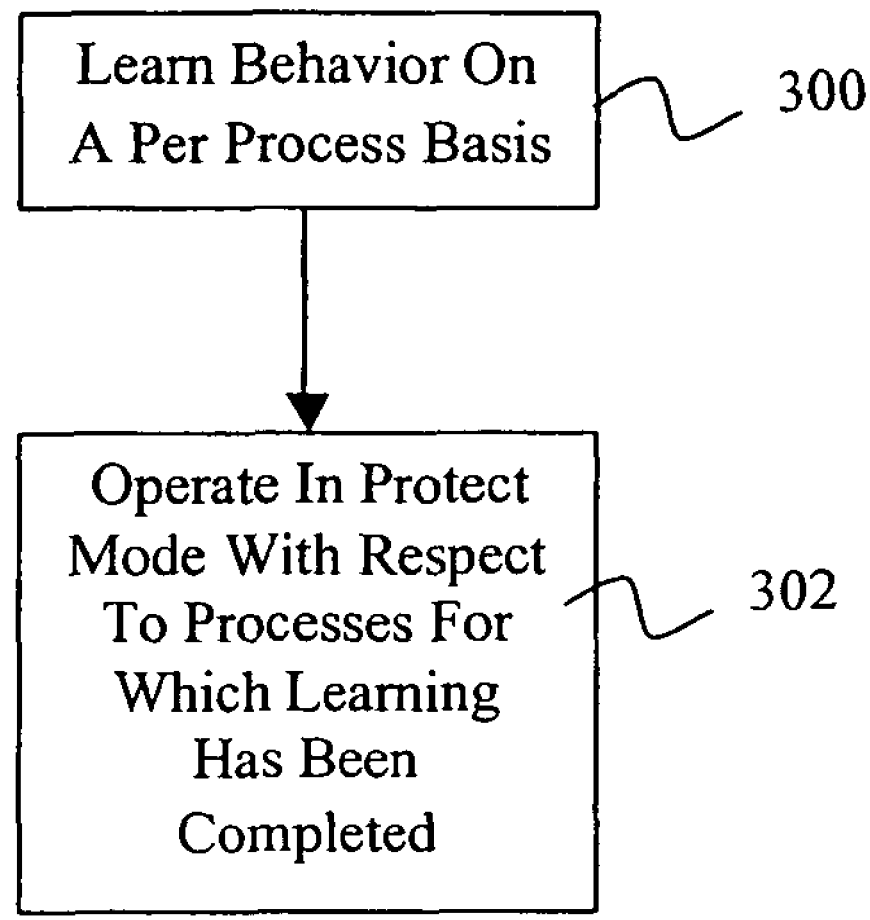
FIG. 3 illustrates a process used in an embodiment to provide computer security using behavioral learning techniques.

FIG. 3 is a flow diagram illustrating a process used in an embodiment to learn and provide protection on a per process basis. In step 300, the behavior associated with each process to be learned is learned on a per process basis. In one embodiment, step 300 comprises for each process starting to learn the baseline or normal behaviors associated with process when a start criteria for the process has/have been met and stop learning the baseline or normal behavior associated with the process when a stop criteria for the process has/have been met. In step 302, after learning a process a protect mode is entered. In one embodiment, the protect mode includes observing behavior associated with the process with respect to which protection is being provided, comparing the observed behavior to the previously-learned baseline, and taking appropriate action in response if a deviation from the baseline/normal behavior is detected.

Figure 4:
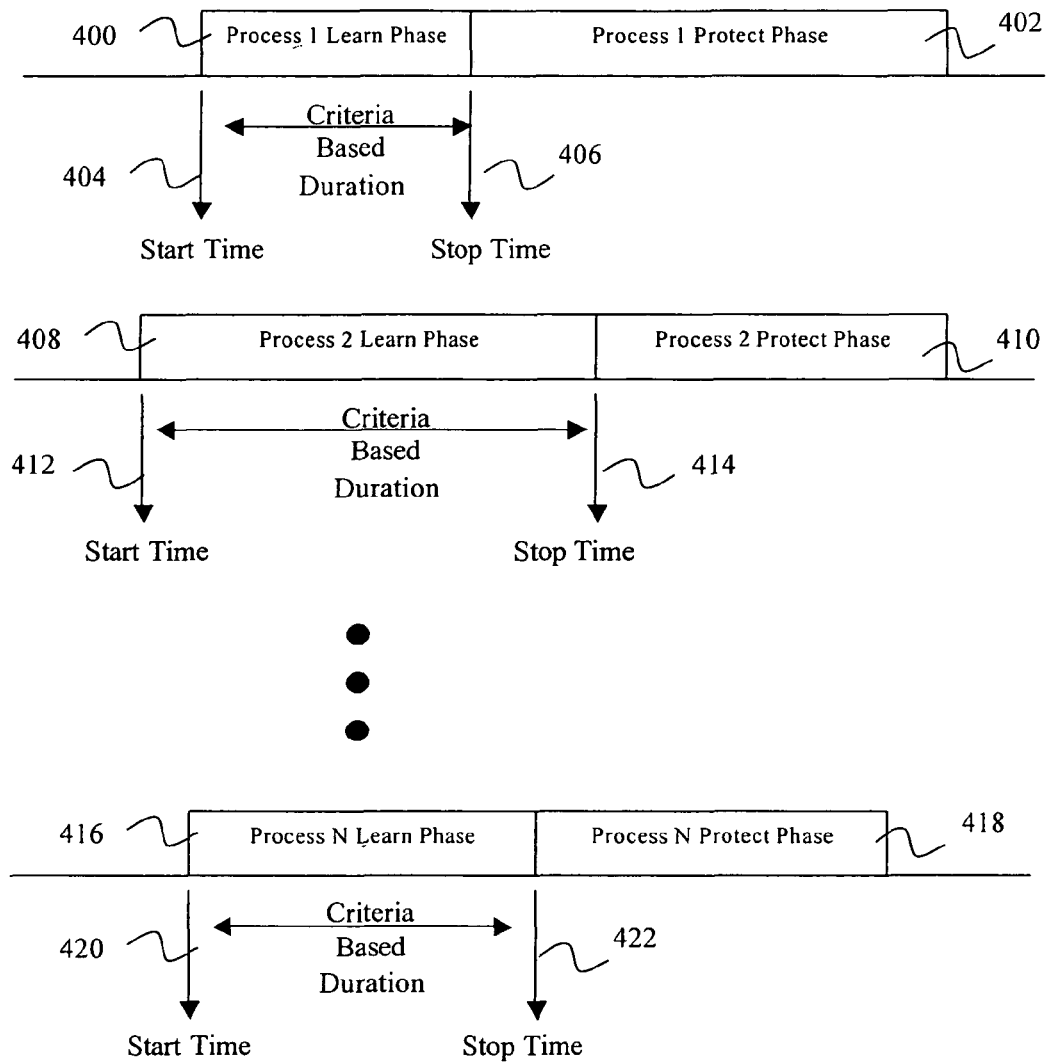
FIG. 4 illustrates the learning phases of different processes.

FIG. 4 is a series of time diagrams illustrating the learning phases of different processes on a per process basis in one embodiment. In one embodiment, start times of the learning phases are selectable and may or may not be the same for different processes. In one embodiment, stop times are based on criteria. Process 1 learn phase 400 starts at start time 404 and stops at stop time 406. Process 1 protect phase 402 begins at stop time 406. Process 2 learn phase 408 starts at start time 412 and stops at stop time 414. Process 2 protect phase 410 begins at stop time 414. Process N learn phase 416 starts at start time 420 and stops at stop time 422. Process N protect phase 418 begins at stop time 422. As illustrated in FIG. 4, the learning phase for any given process may begin at any time, independent of whether learning has started or will at that time (or some later time) start for any other process. In some embodiments, the learning phase for more than one process may or may not start and/or stop at the same time, depending on the implementation and conditions. In some embodiments, the start and/or stop learning criteria for two or more processes may be the same and/or interdependent while also being independent of the start and/or stop criteria of other processes.

Figure 5:
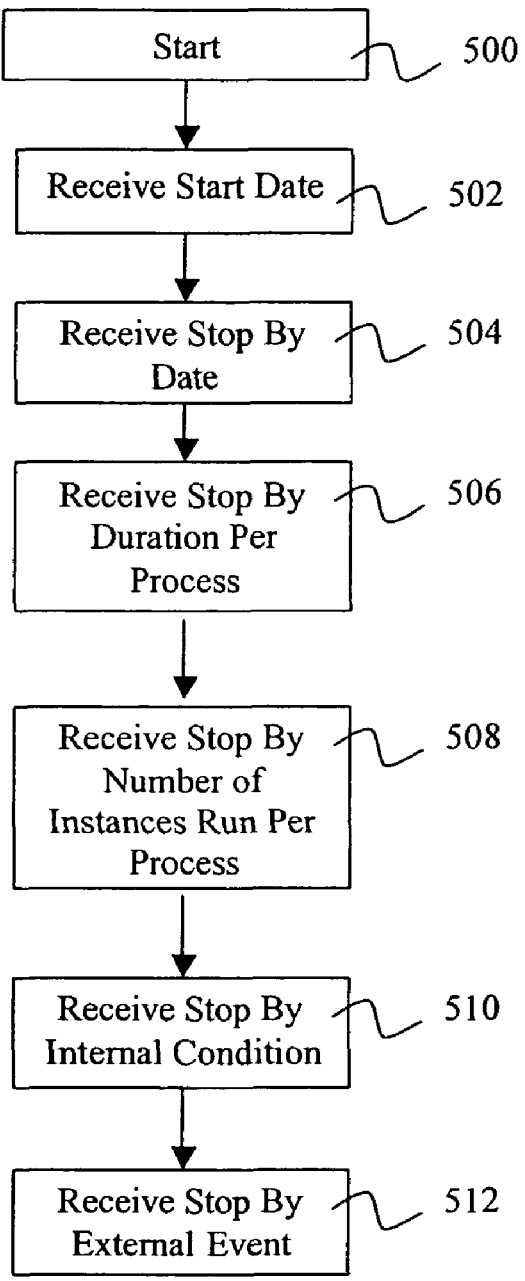
FIG. 5 illustrates a process by which start and stop criteria are selected in an embodiment.

FIG. 5 is a flow diagram illustrating a start and stop criteria selection process used in one embodiment. In one embodiment, the process of FIG. 5 is repeated for each process and/or each type, class, or other group of processes to enable different start and/or stop criteria to be established, if desired for different processes. In another embodiment, the process of FIG. 5 is run just once and within any steps for which different criteria may be specified for different processes and/or groups of process, the step is repeated for each process and/or group of processes for which different criteria may be specified. In step 500, the criteria selection process starts. In step 502, start date information is received. In some embodiments, step 502 comprises receiving specific start time information, in addition to start date information. In step 504, stop date information is received. In some embodiments, step 504 comprises receiving specific stop time information, in addition to start date information. In step 506, stop by duration per process information is received. In one embodiment, "duration per process" refers to a cumulative amount of time that a process has run since the start learning criteria for that process was/were satisfied. In one embodiment, once a process has run during the learning phase for that process for at least the amount of time indicated by the stop by duration per process information received in step 506, learning for that process stops. In step 508, stop by number of instances run per process information is received. In one embodiment, "stop by number of instances run per process" refers to a specified number of times that a process has been instantiated since the start learning criteria for the process was/were satisfied. In step 510, stop by internal condition information is received. In one embodiment, the "stop by internal condition information" may identify a condition internal to a system being protected the occurrence of which results in the learning phase for one or more processes associated with the stop by internal condition information being stopped. One example of such an internal condition would be an indication that learning should be stopped and protection begun with respect to one or more processes if more than three failed login attempts are detected with a prescribed period. In one embodiment, multiple internal conditions may be specified as stop criteria for a given process and/or group of processes. In one embodiment, multiple internal conditions may be identified as stop criteria and the learning stopped if any one of the conditions is present. In one embodiment, multiple internal conditions may be identified as stop criteria and learning stopped only if all, or some specified combination or subset, of the criteria are satisfied. In step 512, stop by external event information is received. In one embodiment, "stop by external event information" may identify an external event or condition the occurrence of which result in learning for one or more processes being stopped. Examples of such events external to the system being protected may include receiving a report from an external source that a worm or other threat is propagating through a network to which the system being protected is attached, receiving a report that a vulnerability associated with one or more processes has been exploited in systems other than the one being protected, or receiving a general security alert from an external source, such as receiving an indication that the threat or security level for a network with which the system being protected is associated has been increased to a level that exceeds an established threshold. In one embodiment, the relationship between different stop criteria is also received. One example of a relationship between stop criteria could be that if any one of the stop criteria is met then the learning is stopped. Or, for another example, the relation between the stop criteria could be that all of the stop criteria must be met before the learning is stopped. In one embodiment, the data shown in FIG. 5 as being received may be received from a system security administrator or other authorized person, process, and/or system, e.g., via a user interface. In one embodiment, the selection process is performed using an input file. In one embodiment, if for a particular process and/or group of processes a type of start or stop criteria is not applicable or not desired to be used, the corresponding step of the process shown in FIG. 5 is omitted. More or fewer, as well as other, fewer, and/or different criteria than those included in the example shown in FIG. 5 may be available and/or used. In one embodiment, start criteria in addition to and/or instead of a start date and/or time may be specified, including without limitation internal conditions, external events, or any other criteria.

Figure 6:
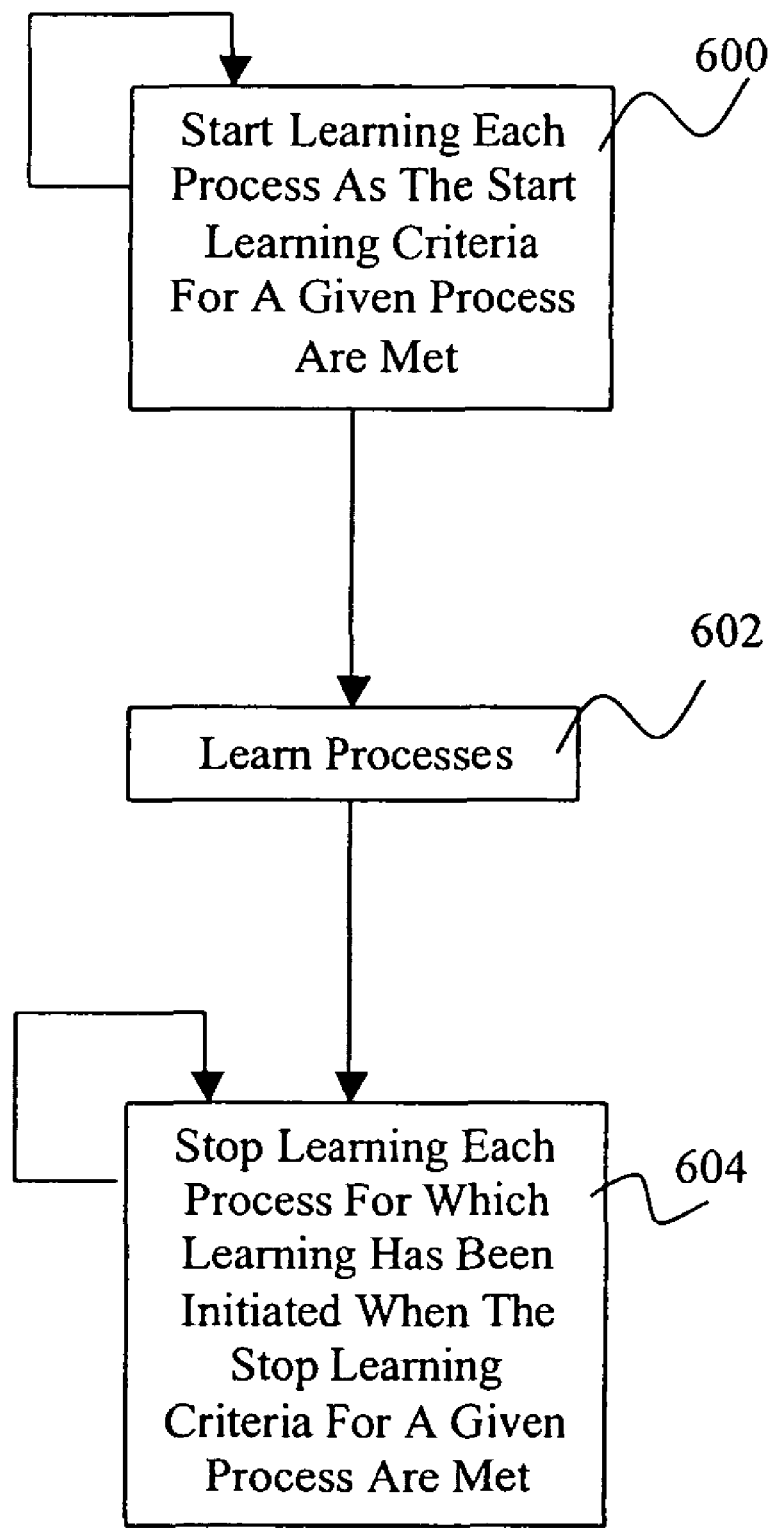
FIG. 6 illustrates a process used in an embodiment to learn normal behavior on a per-process basis.

FIG. 6 illustrates a process used in one embodiment to learn behavior on a per process basis. In one embodiment, the process of FIG. 6 is used to implement step 300 of FIG. 3. In step 600, for each process to be learned the learning process is started as the start learning criteria for that process is/are met. In one embodiment, step 600 is repeated each time the start criteria associated with a process for which learning has not yet started is/are met. In step 602, the processes for which learning has started and not yet stopped are learned. In step 604, for each process for which learning has started and not yet stopped, learning is stopped if/when the stop learning criteria for that process is/are met.

Figure 7:
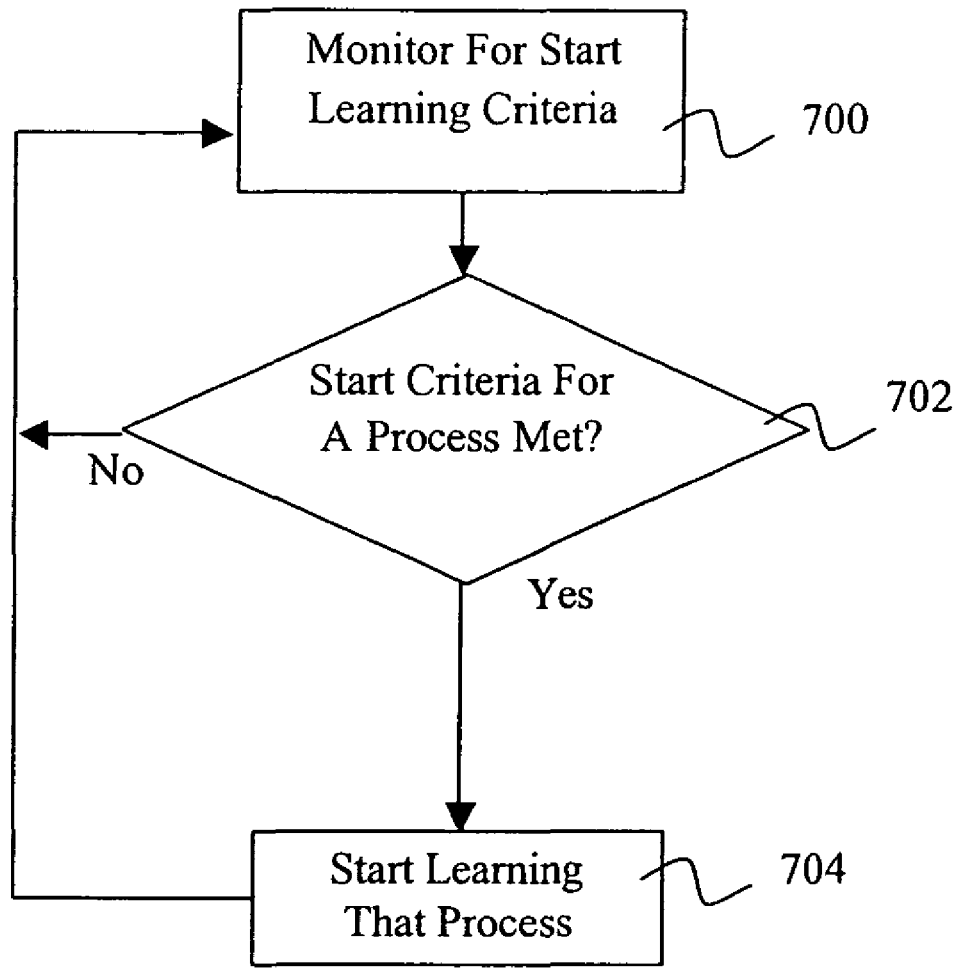
FIG. 7 illustrates a monitoring process used in an embodiment to determine when to start learning on a per process basis.

FIG. 7 illustrates a monitoring process used in an embodiment to check if the start learning criteria for a process to be learned has/have been met. In step 700, received information is monitored to determine if the start learning criteria for any process to be learned is/are satisfied. If it is determined that the start learning criteria for a process to be learned is/are satisfied (step 702), then in step 704 learning starts for that process. If not, the process returns to step 700 and monitoring continues.

Figure 8:
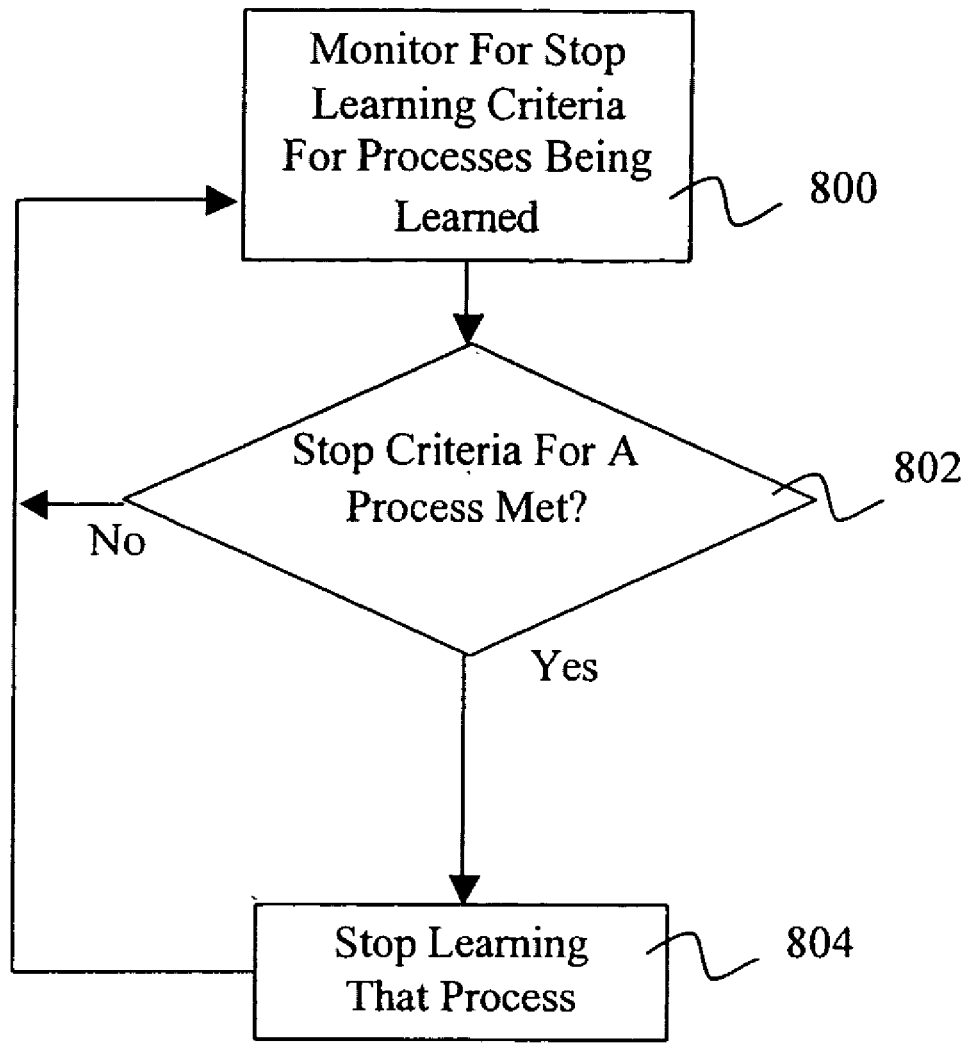
FIG. 8 illustrates a monitoring process used in an embodiment to determine when to stop learning on a per process basis.

FIG. 8 illustrates a monitoring process used in an embodiment to check if the stop learning criteria for a process being learned has/have been met. In step 800, received information is monitored to determine if the stop learning criteria for any process that is being learned is/are satisfied. If it is determined that the stop learning criteria for a process being learned is/are satisfied (step 802), then in step 804 learning stops for that process. If not, the process returns to step 800 and monitoring continues.

Figure 9:
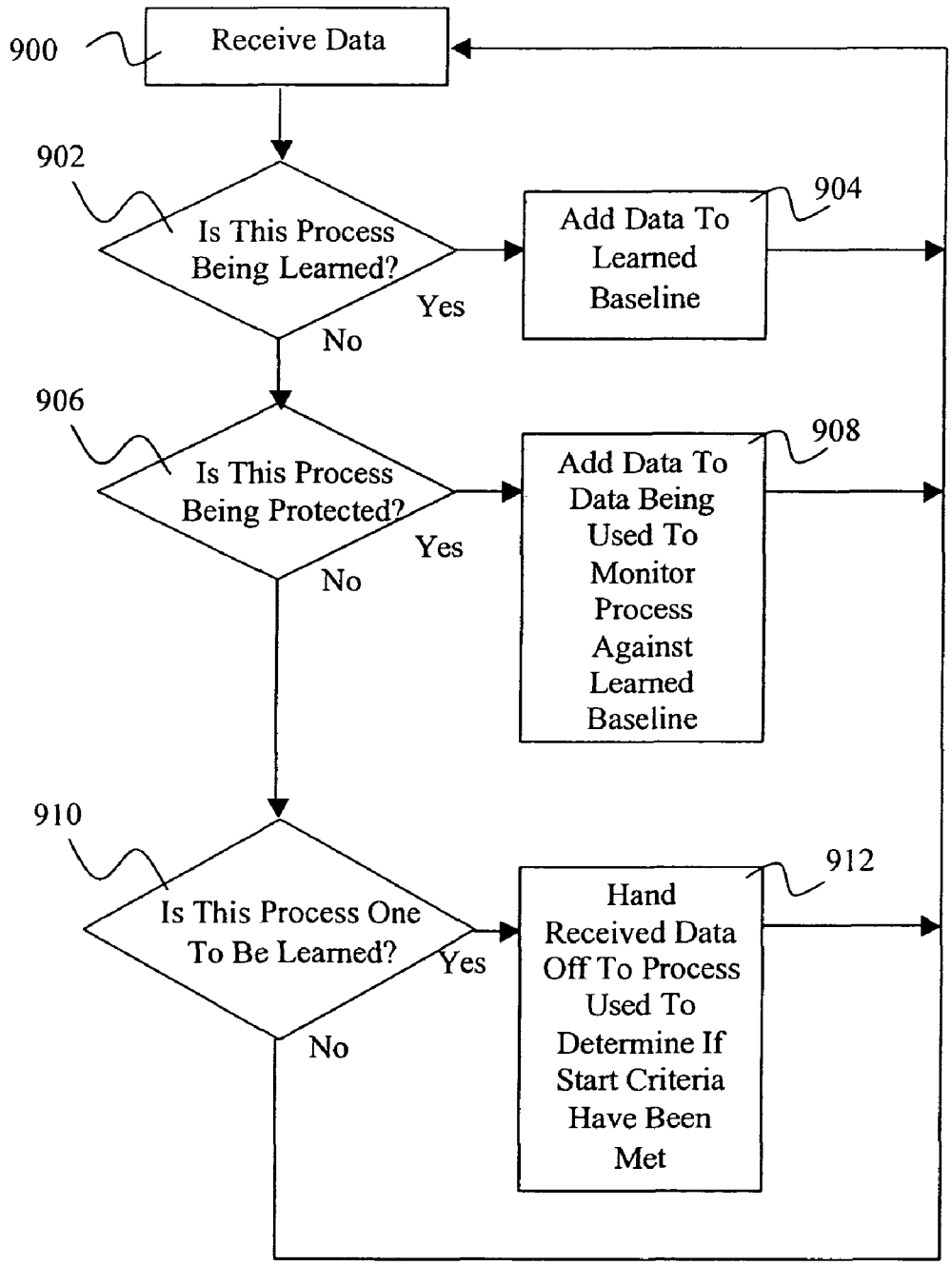
FIG. 9 illustrates a process used in an embodiment to process system data.

FIG. 9 illustrates a process used in one embodiment to process data for purposes of learning baseline behavior and entering a protect phase on a per process basis. In one embodiment, the process of FIG. 9 is implemented by the analysis engine 206 of FIG. 2. In one embodiment, the process of FIG. 9 is used by an analysis engine to process data received from an agent configured to provide data associated with an operating system, such as agent 204 of FIG. 2. In step 900, data is received. In step 902, it is determined whether the data is associated with a process that is being learned (i.e., for which learning has started and not yet stopped). If so, then in step 904 the information is added to a learned database of information that comprises, reflects, and/or is being used to learn the baseline or normal behavior associated with the process. The process then returns to step 900 in which the next data is received. If it is determined that the received data is not associated with a process that is being learned (step 902), then in step 906 it is determined whether the data is associated with a process that is being protected (i.e., one for which learning has been completed or suspended and a protect mode has been entered). If so, then in step 908 the information is added to the data being used to monitor the observed behavior associated with the process against the learned baseline or normal behavior. After step 908, the process returns to step 900 and the next data is received. If it is determined that the received data is not associated with a process that is being protected (i.e., it is neither currently being learned nor currently being protected), then in step 910 it is determined whether the process with which the received data is associated is a process to be learned. If yes, then in step 912 the received data is handed off to a process used to determine whether the start learning criteria for the process is/are satisfied. After step 912, or if it is determined in step 910 that the received data is not associated with a process to be learned, the process of FIG. 9 returns to step 900 in which the next data is received.

Figure 10:
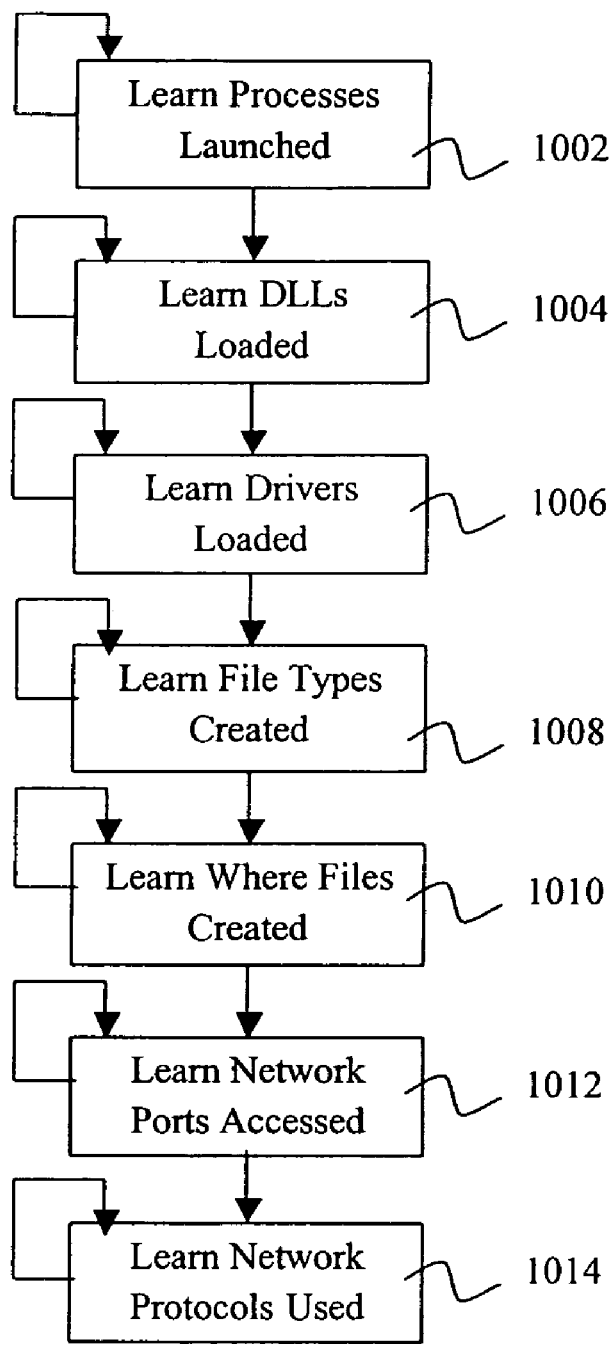
FIG. 10 illustrates how a process is learned in an embodiment.

FIG. 10 is a flow diagram illustrating a process used in an embodiment to learn processes on a per process basis. In one embodiment, the process of FIG. 10 is used to implement step 602 of FIG. 6. In one embodiment, the process of FIG. 10 is implemented on a per process basis, such that the process of FIG. 10 is run for each process during the learning phase for that process. In step 1002, the processes launched by the process are learned. In one embodiment, the processes launched by the process being learned are learned by storing in a database data associated with each such launched process. In step 1004, the dynamically linked libraries (DLLs) loaded by the process are learned. In step 1006, the drivers loaded by the process are learned. In step 1008, the file types of files created by the process are learned. In step 1010, the locations in which files are created are learned. In step 1012, the network ports accessed by the process are learned. In step 1014, the network protocols used by the process are learned. In other embodiments, other, further, and/or different information may be used to learn the baseline or normal behavior associated with a process.

Figure 11:
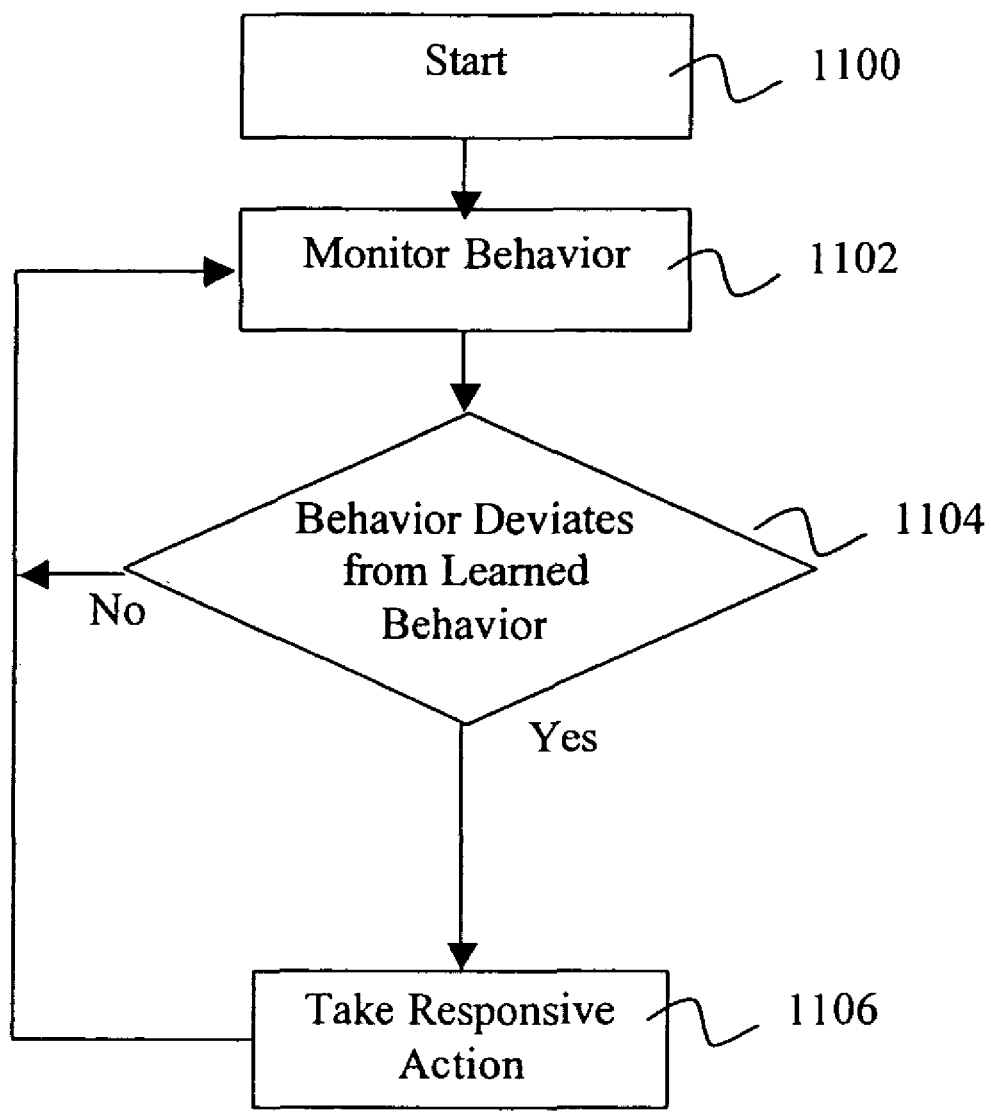
FIG. 11 illustrates a process used in an embodiment to provide security in a protect phase.

FIG. 11 illustrates a protect phase process used in an embodiment to provide protection on a per process basis. In one embodiment, the process of FIG. 11 is used to implement step 302 of FIG. 3. In one embodiment, the process of FIG. 11 is performed independently for each process that is learned and begins once the learning phase for that process has stopped. In step 1100, the process starts. In step 1102, the observed behavior associated with the process is monitored. In one embodiment, the observed behavior is monitored by receiving data identified as being relevant to such monitoring (e.g., in steps 906 and 908 of FIG. 9) and comparing the data to corresponding data associated with previously-learned baseline or normal behavior associate with the process being monitored. In step 1104, it is determined whether the observed behavior deviates from the learned baseline/normal behavior. If not, the analysis engine returns to step 1102 and monitoring of observed behavior associated with the process continues. If it is determined that the observed behavior deviates from the learned baseline/normal behavior (step 1104), in step 1106 responsive action is taken. In one embodiment, depending on the process and the nature and/or materiality of the deviation found, the responsive action may comprise ignoring the deviation, recording the deviation in a log file, causing the process being monitored to be terminated, or any other appropriate responsive action. For example, if the monitored process behavior deviates from the learned process behavior in that the monitored process creates new files and creates new processes, the monitored process may be terminated in one embodiment because the behavior represents a significant security risk to the system. Or, for another example, if the monitored process behavior deviates from the learned process behavior in that the monitored process makes unusually frequent access and reads of files, the activity may be recorded in a log file for the system administrator to examine for possible problems. In one embodiment, the action taken in response to a deviation may be configured by an authorized user, system, and/or process.

In one embodiment, learning and protecting on a per process basis facilitates rapid response to changes, such as the installation of new hardware or software, installation of a patch or other change to existing software, etc. In one embodiment, only those processes affected and/or likely to be affected by the change are relearned.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for detecting deviations from normal behavior in a processing system comprising:

starting a first learning phase for a first process associated with an application running on the processing system based on a first start criteria associated with the first process;

learning, by a computer of the processing system, during the first learning phase, normal behavior associated with the first process;

starting a second learning phase for a second process associated with the application;

stopping the first learning phase, by the computer of the processing system, based on a first stop criteria associated with the first process and without regard to whether a second stop criteria associated with the second process is satisfied;

starting a first protect phase for the first process running on the processing system based at least in part on completion of the first learning phase for the first process, wherein the first protect phase is configured to start prior to the completion of the second learning phase;

stopping the second learning phase; and starting a second protect phase for the second process wherein the second protect phase initiation is independent of the first protect phase initiation and the second protect phase controls behavior of the second process independently of the first protect phase.

2. The method for detecting deviations from normal behavior in a processing system as in claim 1 wherein the first start criteria includes a user selectable start date.

3. The method for detecting deviations from normal behavior in a processing system as in claim 1 wherein the first start criteria includes a user selectable start time.

4. The method for detecting deviations from normal behavior in a processing system as in claim 1 wherein the first stop criteria includes a user selectable stop date.

5. The method for detecting deviations from normal behavior in a processing system as in claim 1 wherein the first stop criteria includes a user selectable stop time.

6. The method for detecting deviations from normal behavior in a processing system as in claim 1 wherein the first stop criteria includes a user selectable duration per process.

7. The method for detecting deviations from normal behavior in a processing system as in claim 1 wherein the first stop criteria includes a user selectable number of instances run per process.

8. The method for detecting deviations from normal behavior in a processing system as in claim 1 wherein the first stop criteria includes a user selectable internal condition.

9. The method for detecting deviations from normal behavior in a processing system as in claim 1 wherein the first stop criteria includes a user selectable external event.

10. The method for detecting deviations from normal behavior in a processing system as in claim 1 wherein learning the normal behavior associated with the first process includes learning processes launched by the first process.

11. The method for detecting deviations from normal behavior in a processing system as in claim 1 wherein learning the normal behavior associated with the first process includes learning DLLs loaded by the first process.

12. The method for detecting deviations from normal behavior in a processing system as in claim 1 wherein learning the normal behavior associated with the first process includes learning drivers loaded by the first process.

13. The method for detecting deviations from normal behavior in a processing system as in claim 1 wherein learning the normal behavior associated with the first process includes learning file types created by the first process.

14. The method for detecting deviations from normal behavior in a processing system as in claim 1 wherein learning the normal behavior associated with the first process includes learning where files are created by the first process.

15. The method for detecting deviations from normal behavior in a processing system as in claim 1 wherein learning the normal behavior associated with the first process includes learning network ports accessed by the first process.

16. The method for detecting deviations from normal behavior in a processing system as in claim 1 wherein learning the normal behavior associated with the first process includes learning network protocols used by the first process.

17. The method for detecting deviations from normal behavior in a processing system as in claim 1, wherein the first protect phase includes:

monitoring the system behavior on a per process basis;

checking for deviations from learned normal behavior associated with the first process; and taking responsive action if a deviation from normal behavior associated with the first process is detected while continuing to learn normal behavior associated with the second process, wherein learning phases are completed upon one of: a specified duration per process and a specified duration process, and wherein learning phases and protect phases may proceed in parallel for separate processes of an application.

18. The method for detecting deviations from normal behavior in a processing system as in claim 1 further comprising:

receiving data;

determining whether a process with which the data is associated is currently being learned; and adding the data to a body of data being used to learn an allowed behavior of one or more processes, including the process with which the data is associated if it is determined that the process with which the data is associated is currently being learned.

19. The method for detecting deviations from normal behavior in a processing system as in claim 1 further comprising:

receiving data;

determining whether a process with which the data is associated is being protected; and adding the data to a body of data being used to compare an actual behavior of the process to the learned normal behavior associated with the process if it is determined that the process is being protected.

20. The method for detecting deviations from normal behavior in a processing system as in claim 1 further comprising:

receiving data;

determining whether a learning phase should be started with respect to a process with which the data is associated; and starting a learning phase for the process if it is determined that a learning phase should be started for the process.

21. A non-transitory computer readable storage medium having embodied thereon computer instructions which when executed by a computer cause the computer to perform a method comprising:

starting a first learning phase for a first process based on a first start criteria associated with the first process associated with an application running on the processing system;

learning, during the first learning phase, normal behavior associated with the first process;

starting a second learning phase for a second process associated with the application;

stopping the first learning phase based on a first stop criteria associated with the first process and without regard to whether a second stop criteria associated with the second process is satisfied;

starting a first protect phase for the first process running on the processing system based at least in part on completion of the first learning phase for the first process, wherein the first protect phase is configured to start prior to the completion of the second learning phase;

stopping the second learning phase; and starting a second protect phase for the second process wherein the second protect phase initiation is independent of the first protect phase initiation and the second protect phase controls behavior of the second process independently of the first protect phase.

22. A system for detecting deviations from normal behavior in a processing system comprising:

a computer processor configured to:

start a first learning phase for a first process based on a first start criteria associated with the first process associated with an application running on the processing system;

learn, during the first learning phase, normal behavior associated with the first process;

start a second learning phase for a second process associated with the application;

stop the first learning phase based on a first stop criteria associated with the first process and without regard to whether a second stop criteria associated with the second process is satisfied;

start a first protect phase for the first process running on the processing system based at least in part on completion of the first learning phase for the first process, wherein the first protect phase is configured to start prior to the completion of the second learning phase;

stop the second learning phase; and start a second protect phase for the second process wherein the second protect phase initiation is independent of the first protect phase initiation and the second protect phase controls behavior of the second process independently of the first protect phase.

23. The method for detecting deviations from normal behavior in a processing system as in claim 1, further comprising:

installing a change to existing software;

re-learning one or more processes affected by the change to the existing software; and continuing a protect phase for one or more processes associated with the software which are not affected by the change.

* * * * *